Dec. 11, 1923.
E. SCHRÖDER
1,477,009
DEVICE FOR HEATING FORGING PIECES BY ELECTRIC RESISTANCE HEATING
Filed July 6, 1921
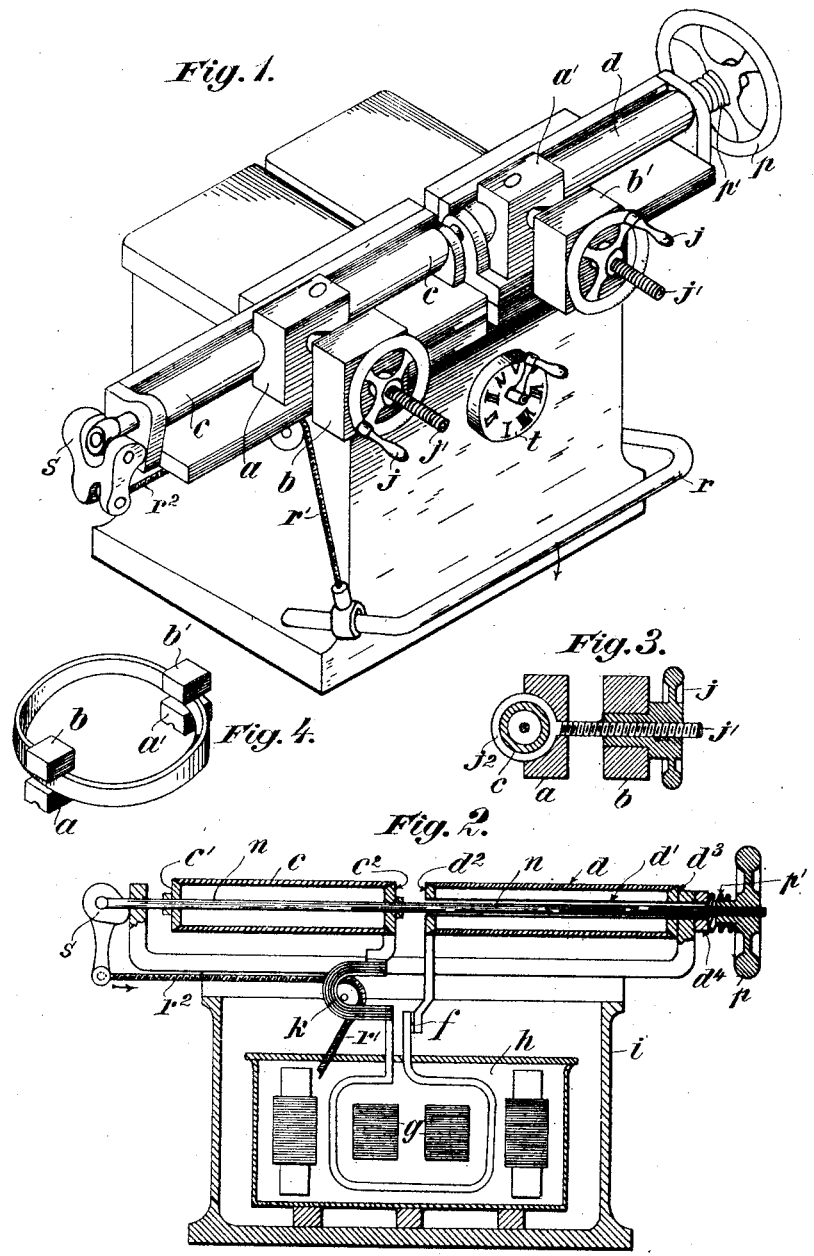

Patented Dec. 11, 1923.

1,477,009

UNITED STATES PATENT OFFICE.

EDMUND SCHRÖDER, OF BERLIN, GERMANY, ASSIGNOR TO THE FIRM BRAUN-BRÜNING & CO., OF BASEL, SWITZERLAND.

DEVICE FOR HEATING FORGING PIECES BY ELECTRIC-RESISTANCE HEATING.

Application filed July 6, 1921. Serial No. 482,740.

*To all whom it may concern:*

Be it known that I, EDMUND SCHRÖDER, engineer, citizen of the German Republic, and residing at Nos. 48-51 Maybach-Ufer, Berlin, Germany, have invented certain new and useful Improvements in Devices for Heating Forging Pieces by Electric-Resistance Heating, of which the following is a specification.

This invention relates to a device for heating forging pieces by an electric current. This device excels the known devices of similar kind by its capability of adaptation to the given circumstances, as well as by its constructional strength whereby it is made very resistible to wear and tear.

The invention is illustrated in the accompanying drawing in which Figure 1 is a perspective view of the device. Figure 2 is a vertical section through the chief parts; and Figures 3 and 4 are details which are also duly described in detail hereinafter.

$a\ b$ and $a'\ b'$ are two pairs of gripping jaws, of which $a$ is in contact with a copper or brass or bronze tube $c$ and $a'$ is in contact with a like tube $d$. The two tubes are connected at $e$ and $f$ with the secondary poles of a transformer $g$ located in an oil box $h$ which in its turn is located in a water vessel $i$.

The jaws $a\ a'$ have each at the rear a semicircular groove corresponding to the tubes $c$ and $d$, and besides said grooves semicircular recesses are provided receiving each a ring $j^2$ (Fig. 3) which encompasses the respective tube ($c$ or $d$) and is made integral with a threaded spindle $j'$ which passes through the associate jaw ($b$ or $b'$) and carries in front of this latter a hand wheel $j$. The jaws $a$ and $a'$ consist preferably of copper.

As long as the jaws $b$ and $b'$ are not pressed against the jaws $a$ and $a'$ by means of the hand wheels $j$ and the spindles $j'$, they may be easily displaced along the tubes $c$ and $d$. Only when the work piece has been clamped fast in the jaw pairs whereby the rear half of each ring $j^2$ is drawn tight against the respective tube ($c$ and $d$), the jaws $a$ and $a'$ are firmly pressed against said tubes so that a very good contact is established.

Owing to the jaws being not only displaceable along the tubes $c$ and $d$ in horizontal direction, but also rotatable upon them in vertical direction, they are excellently adjustable and fit for adaptation to any requirement.

Straight pieces which are to be heated between their ends, or for any portion between the latter respectively, are clamped in between the jaws after these have been suitably displaced in horizontal direction upon the tubes $c$ and $d$. The circuit is then closed by the stepped switch $t$, Figure 1, and the voltage is appropriately adjusted. If curved pieces are to be heated, either one of the jaw pairs is, or both jaw pairs are, moved not only horizontally, but also vertically, just as the configuration of the respective piece requires. If it is a circular piece, for instance a wheel rim or the like, as in Figure 4, the spindles $j'$ are turned upwards into vertical position and the wheel rim etc is clamped in horizontal position, as shown. If a work piece is to be heated at one end only, it is, firstly, clamped between the jaws $a'$ and $b'$ in such a manner that the end to be heated extends in the direction to the other jaws ($a$ and $b$). Then a metal block forming an auxiliary electrode is clamped in between the jaws $a$ and $b$ and these latter together with said block are shoved against the work piece, that is to say, against the end to be heated.

The tube $c$ has cover-like end-pieces $c^1\ c^2$ by means of which it is affixed to a horizontal rod $n$ (Fig. 2) supported at its lefthand end in a vertically bent-off arm of a horizontal carrier $m$ and extending in the other direction through a pipe $d'$ connected with cover-like end-pieces $d^2\ d^3$ of the tube $d$, as well as with the other bent-off arm of said carrier $m$. The pipe $d'$ is secured in said latter arm by the neighbouring end-piece $d^3$ and a collar $d^4$ attached to the projecting end of the pipe $d'$. The righthand end of the rod $n$ is threaded and carries a handwheel $p$, and a spring $p'$ is arranged between this hand wheel and the collar $d^4$. The tube $c$ and the respective transformer pole are movably connected with each other by the mediation of a flexible member $k$ which is connected at one end with that pole and at the other end with the end-disk $c^2$. The other pole is rigidly connected with the end-disk $d^2$.

$r$ is a U-shaped tube which is hinged at its ends to the frame of the machine and forms a treadle which is connected at one side with a rope $r^1\ r^2$, the other end of which is attached to a lever-like twin member (Fig. 1) which is hinged to the projecting end of the rod $n$ (at the lefthand end of it) and forms at its centre parts two cams which draw the rod $n$ to the left when the treadle $r$ is depressed.

If a work-piece is to be heated through its entire length, it is clamped in either between auxiliary blocks inserted between the jaws $a$ $b$ and $a'$ $b'$, or between the lateral surfaces of these jaws themselves but prior thereto the jaws $a$ and $b$ have been so adjusted upon the tubes $c$ and $d$ that to secure the work-piece finally in its place only the treadle $r$ need be depressed and then let loose so as first to increase the space between the tubes $c$ and $d$ by the means described and then decrease it when the lateral surfaces of the jaws will grip the piece and hold it fast.

Each of the jaws may have one or more holes to receive auxiliary electrodes of any desired or suitable shape, by the mediation of which the work-piece may be heated just in the portion or zone required for the purpose. Owing to the possibility of moving the tube $c$ in the direction to the tube $d$ by means of the hand-wheel $p$, the apparatus may be employed for jumping or jogging, and it may be employed also as butt-welding machine.

The tubes $c$ and $d$ may be connected with a water-conduit for conducting cooling water through them during the welding operation.

Having now described my invention, what I desire to secure by a patent of the United States is:

1. A device for heating forging pieces and the like by electrical resistance heating, comprising, in combination, two co-axial tubes; a transformer; conducting connections between said tubes and the poles of said transformer; and two pairs of gripping jaws, of which one is in contact with one of said tubes and the other is in contact with the other of said tubes; said pairs of jaws being adapted to be displaced along the said tubes, as well as to be turned upon them, for the purpose set forth.

2. A device for heating forging pieces and the like by electric resistance heating, comprising, in combination: two co-axial tubes, of which the one is adapted to be displaced in the direction to the other; a treadle; a connection between said displaceable tube and said treadle; elastic means for automatically moving the said tube back into its former position; a transformer; conducting connections between said tubes and the poles of said transformer; and two pairs of gripping jaws, of which one is in contact with one of said tubes and the other is in contact with the other of said tubes; said pairs of jaws being adapted to be displaced along the said tubes, as well as to be turned upon them, for the purpose set forth.

In witness whereof I have hereunto set my hand.

EDMUND SCHRÖDER.